(12) United States Patent
Matsumoto

(10) Patent No.: US 11,623,641 B2
(45) Date of Patent: Apr. 11, 2023

(54) FOLLOWING TARGET IDENTIFICATION SYSTEM AND FOLLOWING TARGET IDENTIFICATION METHOD

(71) Applicant: HONDA MOTOR CO., LTD., Tokyo (JP)

(72) Inventor: Tadashi Matsumoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 224 days.

(21) Appl. No.: 16/935,969

(22) Filed: Jul. 22, 2020

(65) Prior Publication Data
US 2021/0031769 A1 Feb. 4, 2021

(30) Foreign Application Priority Data
Aug. 1, 2019 (JP) .............................. JP2019-142168

(51) Int. Cl.
*B62B 5/00* (2006.01)
*B60W 30/165* (2020.01)
*B60W 40/04* (2006.01)

(52) U.S. Cl.
CPC .......... *B60W 30/165* (2013.01); *B60W 40/04* (2013.01); *B62B 5/0026* (2013.01);
(Continued)

(58) Field of Classification Search
CPC ........ B62B 5/0026; B62B 5/0069; B62B 5/00
See application file for complete search history.

(56) References Cited

U.S. PATENT DOCUMENTS

| 9,643,638 | B1 * | 5/2017 | Wittliff, III | ........... G05D 1/0016 |
| 10,180,683 | B1 * | 1/2019 | Libman | ................ G05D 1/0246 |

(Continued)

FOREIGN PATENT DOCUMENTS

| CN | 105867380 A | * | 8/2016 | ........... G05D 1/0214 |
| JP | 2015087969 A | | 5/2015 | |

(Continued)

OTHER PUBLICATIONS

Deng et al, "Robust Heading Estimation for Indoor Pedestrian Navigation Using Unconstrained Smartphones", Jul. 3, 2018, Hindawi, Wireless Communications and Mobile Computing vol. 2018, whole document (Year: 2018).*

(Continued)

*Primary Examiner* — Peter D Nolan
*Assistant Examiner* — Kenneth M Dunne
(74) *Attorney, Agent, or Firm* — Armstrong Teasdale LLP

(57) ABSTRACT

A following target identification system is used for identifying a following target of a moving object configured to move autonomously. The following target identification system includes: a portable information generation terminal having a wireless communication function and configured to generate following target information about a movement of the following target in a state where the information generation terminal is carried by the following target; a communication unit included in the moving object and configured to receive the following target information sent from the information generation terminal via wireless communication with the information generation terminal; and a following control unit included in the moving object and configured to determine a position of the following target based on the following target information.

17 Claims, 14 Drawing Sheets

(52) U.S. Cl.
CPC ....... *B62B 5/0069* (2013.01); *B60W 2420/42* (2013.01); *B60W 2554/4042* (2020.02); *B60W 2554/4044* (2020.02)

(56) References Cited

U.S. PATENT DOCUMENTS

| | | | |
|---|---|---|---|
| 10,262,541 | B2 | 4/2019 | Miyazawa et al. |
| 10,271,623 | B1* | 4/2019 | Qi ............................. A45C 5/03 |
| 2010/0002908 | A1* | 1/2010 | Miyamoto .............. G06T 7/215 |
| | | | 382/103 |
| 2014/0039676 | A1* | 2/2014 | Fernando ............. G05D 1/0214 |
| | | | 901/1 |
| 2016/0261698 | A1* | 9/2016 | Thompson ........... G06V 10/242 |
| 2016/0335509 | A1 | 11/2016 | Nakata |
| 2017/0003682 | A1* | 1/2017 | Segman ................. B62B 5/0033 |
| 2018/0129872 | A1* | 5/2018 | Zhang ...................... G05D 1/12 |
| 2018/0181137 | A1* | 6/2018 | Choi ..................... G06V 10/764 |
| 2018/0245927 | A1* | 8/2018 | Frish ........................ G01S 19/49 |
| 2018/0335786 | A1* | 11/2018 | Ding ....................... G06V 40/10 |

FOREIGN PATENT DOCUMENTS

| | | | |
|---|---|---|---|
| JP | 2016212675 | A | 12/2016 |
| JP | 6222531 | B2 | 11/2017 |
| JP | 2017204193 | A | 11/2017 |

OTHER PUBLICATIONS

Notice of Reasons for Refusal for Japanese Patent Application No. 2019-142168 dated Oct. 18, 2022; 10 pp.

\* cited by examiner

FOLLOWING TARGET IDENTIFICATION SYSTEM AND FOLLOWING TARGET IDENTIFICATION METHOD

TECHNICAL FIELD

The present invention relates to a following target identification system and a following target identification method for identifying a following target of a moving object configured to move autonomously.

BACKGROUND ART

In recent years, in several fields such as a field of automobile industry, technologies such as Adaptive Cruise Control (ACC) and Cooperative Adaptive Cruise Control (CACC) have spread as technologies for following a preceding vehicle. Further, by improving these technologies for following a preceding vehicle, a technology for "vehicle platooning" on a highway or the like has been developed. In this vehicle platooning, for enabling a following vehicle to follow a leading vehicle (namely, a following target vehicle traveling in front of the following vehicle), the following vehicle is controlled to continuously follow the leading vehicle based on a current position of the leading vehicle.

There are several known techniques for enabling the following vehicle to follow the leading vehicle during the vehicle platooning. For example, in a known technique, a direction and a distance of the leading vehicle is calculated based on a position of a rear license plate of the leading vehicle in an image and the size of characters therein, and thus a travel operation of the following vehicle is controlled based on the direction and the distance of the leading vehicle (see JP2015-087969A).

For example, in another known technique, the leading vehicle sends coordinate information, which indicates the trajectory of the own vehicle based on a Global Positioning System (GPS), to the following vehicle via inter-vehicle communication. Then, in the following vehicle, the steering control of the own vehicle is executed based on the coordinate information (see Japanese Patent No. 6222531).

By the way, the inventor of the present application has found that the above techniques for enabling the following vehicle to follow the leading vehicle can be widely applied not only to the vehicles but also to any following target (for example, a robot, a person, an animal, or the like) and any moving object (for example, a robot, an electric cart, a drone, or the like) that moves autonomously to follow the following target.

However, in the known technique of JP2015-087969A, the direction and the distance of the leading vehicle are calculated based on the image of the license plate, and thus the following target is limited to an object provided with the license plate. Moreover, in this known technique, if the occlusion of the leading vehicle is caused by another vehicle traveling therearound (namely, if the following vehicle cannot acquire the image of the license plate), it is difficult for the following vehicle to calculate the direction and the distance of the leading vehicle.

In the known technique of Japanese Patent No. 6222531, the coordinate information of the leading vehicle is acquired via inter-vehicle communication, and thus the occlusion of the leading vehicle is not likely to affect the acquisition of the coordinate information. However, in this known technique, the following target is limited to an object having a GPS. Also, in this known technique, it is difficult for the following vehicle to acquire the coordinate information of the leading vehicle in an environment where signals from GPS satellites cannot be received.

SUMMARY OF THE INVENTION

In view of such a problem of the prior art, a primary object of the present invention is to provide a user with increased flexibility in selecting a following target in a case where a moving object moves autonomously to follow the following target.

To achieve such an object, one embodiment of the present invention provides a following target identification system (1) for identifying a following target (3, 103) of a moving object (2, 102) configured to move autonomously, including: a portable information generation terminal (17, 117) having a wireless communication function and configured to generate following target information about a movement of the following target in a state where the information generation terminal is carried by the following target; a communication unit (11) included in the moving object and configured to receive the following target information sent from the information generation terminal via wireless communication with the information generation terminal; and a following control unit (16) included in the moving object and configured to determine a position of the following target based on the following target information.

According to this arrangement, in a case where the moving object moves autonomously to follow the following target, the portable information generation terminal is carried by another desired moving object (namely, the following target). Thus, it is possible to provide a user with increased flexibility in selecting the following target.

Preferably, the information generation terminal is configured to acquire a speed and an angular velocity of the following target and send the speed and the angular velocity to the communication unit as the following target information, and the following control unit is configured to determine the position of the following target by estimating the position of the following target based on the speed and the angular velocity.

According to this arrangement, the moving object configured to move autonomously can easily determine the position of the following target by receiving the information about the speed and the angular velocity of the following target (namely, the following target information) from the information generation terminal carried by the following target.

Preferably, the information generation terminal is configured to acquire a speed and an angular velocity of the following target, calculate the position of the following target based on the speed and the angular velocity, and send the position of the following target to the communication unit as the following target information.

According to this arrangement, the moving object configured to move autonomously can easily determine the position of the following target by receiving the information about the position of the following target (namely, the following target information) from the information generation terminal carried by the following target.

Preferably, the following target identification system further includes a pairing unit (12) included in the moving object and configured to execute a pairing process about wireless communication between the information generation terminal and the communication unit, wherein the following control unit is configured to set a position of the moving object as an initial position of the following target when the pairing process is completed.

According to this arrangement, when the pairing process about the wireless communication between the communication unit of the moving object and the information generation terminal is completed, the position of the moving object is set as the initial position of the following target (namely, the information generation terminal), so that the initial position of the following target can be set easily.

Preferably, the following target identification system further includes an optical measurement unit (13) included in the moving object and configured to detect one or plural objects present in a moving direction of the moving object and thereby generate object detection information about each of the objects, wherein the following control unit is configured to determine the position of the following target based on the object detection information.

According to this arrangement, the position of the following target can be determined with higher accuracy by using not only the following target information received from the information generation terminal carried by the following target but also the object detection information generated by the optical measurement unit.

Preferably, in a case where the object detection information includes information about the plural objects, the following control unit selects a closest object from the plural objects as the following target whose position is estimated based on the object detection information, the closest object being closest to the position of the following target estimated based on the following target information.

According to this arrangement, even if the object detection information includes information about the plural objects, one following target whose position should be estimated based on the object detection information can be appropriately selected from the plural objects.

Preferably, the following control unit is configured to determine the position of the following target by calculating a weighted average of a first position of the following target estimated based on the following target information and a second position of the following target estimated based on the object detection information.

According to this arrangement, it is possible to easily determine the position of the following target by determining each weight value for the following target information from the information generation terminal and the object detection information from the optical measurement unit according to the importance as to the position of the following target.

Preferably, the information generation terminal includes an inertial measurement unit part (33), and the following control unit is configured to determine weight values in the weighted average based on a cumulative error about the first position caused by the inertial measurement unit part and an inherent error about the second position caused by the optical measurement unit.

According to this arrangement, the weight values in the weighted average can be determined more appropriately by considering the cumulative error caused by the inertial measurement unit part and the inherent error caused by the optical measurement unit.

Preferably, in a case where a distance between the first position and the second position is equal to or greater than a prescribed threshold value, the following control unit determines the first position as the position of the following target regardless of the weighted average.

According to this arrangement, in a case where the distance between the first position and the second position is equal to or greater than the prescribed threshold value (namely, in a case where the optical measurement unit may be erroneously detecting the following target), the position of the following target can be more reliably determined based only on the first position (namely, based only on the following target information).

Preferably, in a case where the distance between the first position and the second position becomes less than the prescribed threshold value after becoming equal to or greater than the prescribed threshold value, the following control unit determines the position of the following target by recalculating the weighted average of the first position and the second position, and in a case where the following control unit recalculates the weighted average, the following control unit reduces a weight value of the first position as compared with a last time.

According to this arrangement, by reducing the weight value of the first position as compared with the last time, it is possible to reduce the influence of the cumulative error caused by the inertial measurement unit part on the determination of the position of the following target.

Preferably, the following target is a person (103), and the moving object is a cart (102) used by the person.

According to this arrangement, in a case where the cart moves autonomously to follow the person (namely, a user of the cart), the person can be easily set as the following target by providing the person with the portable information generation terminal (more precisely, by making the person carry the portable information generation terminal).

Preferably, the following control unit is configured to acquire the angular velocity around a central axis of the person based on the following target information, and in a case where the angular velocity around the central axis of the person is equal to or greater than a prescribed threshold value or in a case where a changing amount of an angle around the central axis of the person is equal to or greater than a prescribed other threshold value, the following control unit determines that the following target has made a change in direction.

According to this arrangement, it is possible to easily recognize the change in direction of the following target by using the angular velocity around the central axis of the person or the changing amount of the angle therearound.

Preferably, the following target identification system further includes a movement control unit (24) included in the moving object and configured to control a moving operation of the moving object, wherein the following control unit is configured to calculate magnitude of the change in direction based on the angular velocity, and the movement control unit is configured to control a following operation of the moving object based on the magnitude of the change in direction.

According to this arrangement, it is possible to easily recognize the magnitude of the change in direction of the following target and thus execute the following operation according to the direction of the following target (namely, according to the magnitude of the change in direction).

Preferably, in a case where the following target makes the change in direction after stopping for a predetermined period and the magnitude of the change in direction is equal to or greater than a first threshold value, the movement control unit controls the moving operation of the moving object such that the moving object approaches the following target.

According to this arrangement, in a case where the magnitude of the change in direction is equal to or greater than the first threshold value (namely, in a case where the person probably needs the cart), it is possible to make the moving object (namely, the cart) approach the following target (namely, the person) without an operation by the person.

Preferably, in a case where the magnitude of the change in direction is equal to or greater than a second threshold value that is greater than the first threshold value, the movement control unit controls the moving operation of the moving object such that a movement of the moving object toward the following target is stopped.

According to this arrangement, in a case where the magnitude of the change in direction is equal to or greater than the second threshold value that is greater than the first threshold value (namely, in a case where the person probably needs to move in the opposite direction), it is possible to prevent the moving object (namely, the cart) from obstructing the movement of the person by stopping the moving object.

Preferably, the following target is a leading vehicle (3), and the moving object is a following vehicle (2).

According to this arrangement, in a case where the following vehicle moves autonomously to follow the leading vehicle, regardless of the equipment of the leading vehicle, the leading vehicle can be simply set as the following target by providing the desired leading vehicle with the portable information generation terminal (more precisely, by making the desired leading vehicle carry the portable information generation terminal).

Also, to achieve the above object, another embodiment of the present invention provides a following target identification method for identifying a following target (3, 103) of a moving object (2, 102) configured to move autonomously, including: generating following target information about a movement of the following target by a portable information generation terminal (17) carried by the following target and having a wireless communication function; receiving the following target information sent from the information generation terminal by the moving object via wireless communication with the information generation terminal; and determining a position of the following target by the moving object based on the following target information.

According to this arrangement, in a case where the moving object moves autonomously to follow the following target, the portable information generation terminal is carried by another desired moving object (namely, the following target). Thus, it is possible to provide a user with increased flexibility in selecting the following target.

Thus, according to an embodiment of the present invention, it is possible to provide a user with increased flexibility in selecting a following target in a case where a moving object moves autonomously to follow the following target.

DESCRIPTION OF THE PREFERRED
EMBODIMENT(S)

In the following, embodiments of a following target identification system and a following target identification method will be described with reference to the drawings.

First Embodiment

Figure 1:
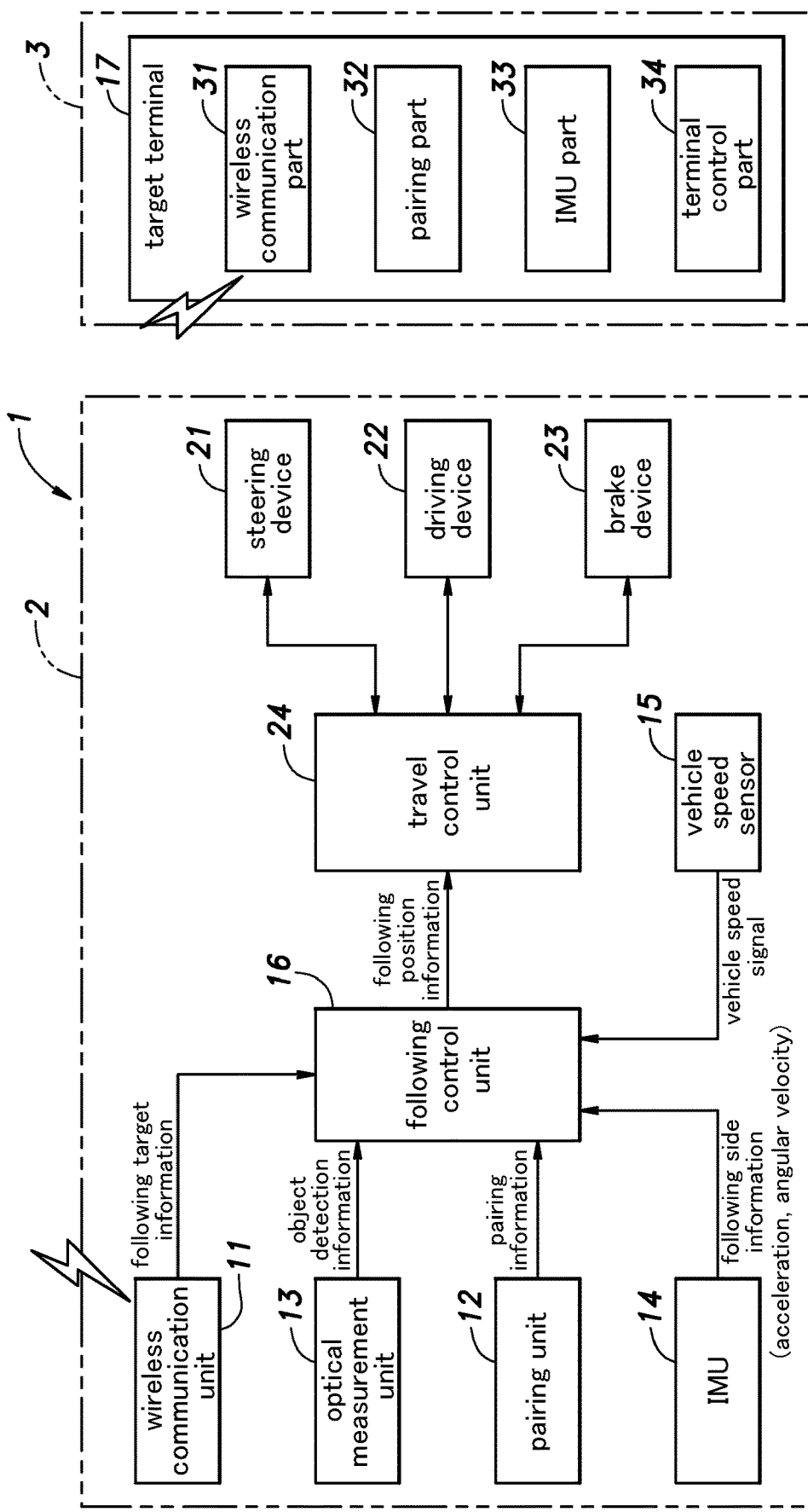
FIG. 1 is a block diagram of a following target identification system according to a first embodiment.
Figure 2:
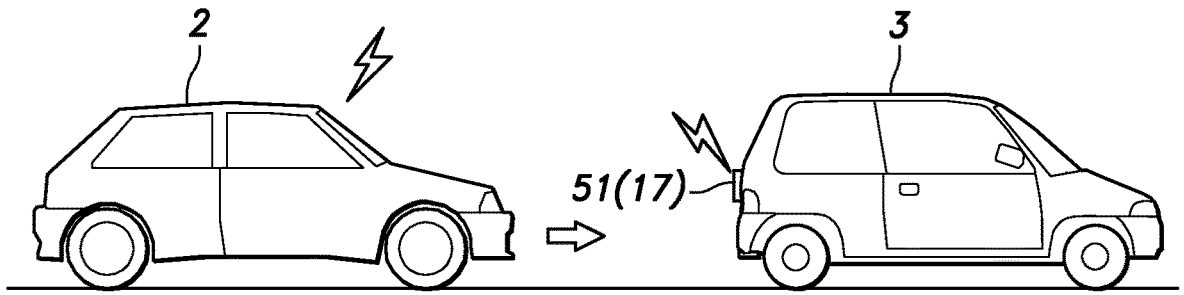
FIG. 2 is an explanatory view showing a moving object and its following target to which the following target identification system according to the first embodiment is applied.

FIG. 1 is a block diagram of a following target identification system 1 according to a first embodiment. FIG. 2 is an explanatory view showing a moving object and its following target (namely, a target to be followed by the moving object) to which the following target identification system 1 is applied.

In a case where the moving object moves autonomously to follow the following target, the following target identification system 1 according to the first embodiment enables a user (for example, an administrator or a non-administrative user of the following target identification system 1) to easily select another desired moving object as the following target. In the first embodiment, a following vehicle 2 as the moving object is configured to move autonomously (namely, travel autonomously on a road) to follow a leading vehicle 3 as the following target (see FIG. 2).

As shown in FIG. 1, the following target identification system 1 includes a wireless communication unit (an example of a communication unit) 11, a pairing unit 12, an optical measurement unit 13, an inertial measurement unit (IMU) 14, a vehicle speed sensor 15, and a following control unit 16 which are mounted on the following vehicle 2. The following target identification system 1 further includes a portable target terminal (an example of an information generation terminal) 17 which is mounted on the leading vehicle 3.

Further, the following vehicle 2 includes components (a steering device 21, a driving device 22, a brake device 23, and a travel control unit (an example of a movement control unit) 24) for enabling the own vehicle to travel autonomously based on information about a position of the following target (leading vehicle 3) determined by the following control unit 16. At least a part of the above-mentioned components for enabling the own vehicle to travel autonomously can function as the components of the following target identification system 1.

Next, devices and the like provided in the following vehicle 2 will be described in detail.

The wireless communication unit 11 is composed of wireless modules such as an antenna and an electronic circuit (not shown). The wireless communication unit 11 is configured to communicate with the target terminal 17 having a wireless communication function by using a known wireless communication standard (for example, Bluetooth (registered trademark)). The wireless communication unit 11 may be configured to communicate with the target terminal 17 by using plural wireless communication standards.

When the following vehicle 2 starts a following operation to follow the leading vehicle 3, the wireless communication unit 11 continuously (or on a prescribed cycle) receives information for determining the position of the following target (namely, a current position during the following operation) from the target terminal 17. In the following, the position of the following target will be referred to as "following target position", and the information for determining the following target position will be referred to as "following target information". This following target information is information about a movement of the following target, and includes, for example, an acceleration, a speed (vehicle speed), and an angular velocity of the following target obtained by the target terminal 17. Further, the following target information may include information about the following target position estimated by the target terminal 17.

When the wireless communication unit 11 starts wireless communication with the target terminal 17 (wireless communication part 31), the pairing unit 12 executes a pairing process for recognizing the target terminal 17 as a specific communication partner. For example, the wireless communication unit 11 is set as a master unit, and the target terminal 17 (wireless communication part 31) is set as a slave unit.

In the above-mentioned pairing process, for example, the pairing unit 12 and the target terminal 17 (pairing part 32) can mutually exchange authentication code and identification information. In some cases, the pairing unit 12 and the target terminal 17 (pairing part 32) may mutually exchange a secret key and identification information by using a public-key cryptosystem. The pairing information obtained by the pairing process is sent from the pairing unit 12 to the following control unit 16 and stored in a memory (not shown). The pairing information includes, for example, authentication code, identification information of the communication partner, and information about success/failure of pairing.

The optical measurement unit 13 is configured to detect one or plural objects (for example, the leading vehicle 3) present in a moving direction (usually, a forward direction) of the following vehicle 2 by using a Light Detection and Ranging technology or a Laser Imaging Detection and Ranging technology (LIDAR technology).

More specifically, the optical measurement unit 13 is configured to detect one or plural objects present in the vicinity of the following vehicle 2 by emitting laser light in the moving direction of the following vehicle 2 and detecting a reflected wave thereof. Thereby, the optical measurement unit 13 is configured to sequentially generate object detection information about each detected object, which includes information about a point group measured for each object. The object detection information is sent from the optical measurement unit 13 to the following control unit 16. The optical measurement unit 13 can three-dimensionally detect one or plural objects present in the moving direction of the following vehicle 2. The object detection information generated by the optical measurement unit 13 by using the LIDAR technology may include an inherent error caused by the optical measurement unit 13.

In the following target identification system 1, a camera (for example, a stereo camera that can measure a distance to the object) can be used as the optical measurement unit 13 instead of or in addition to a device using the LIDAR technology. In a case where the camera is used as the optical measurement unit 13, the object (candidate for the following target) can be recognized in an image by using a known technique and thus the distance to the object can be measured.

The inertial measurement unit (IMU) 14 includes a triaxial acceleration sensor, a triaxial gyroscope, a processor, and the like, and is configured to sequentially measure an acceleration and an angular velocity of the following vehicle 2. Also, the IMU 14 can calculate the speed of the following vehicle 2 based on the measured acceleration. The information of the following vehicle 2 (hereinafter referred to as "following side information") acquired (or measured) by the IMU 14 is sent to the following control unit 16.

The vehicle speed sensor 15 sequentially sends a vehicle speed signal generated according to a rotation speed of an axle (wheels) to the following control unit 16. The following control unit 16 can calculate the vehicle speed of the following vehicle 2 based on the vehicle speed signal. In the following target identification system 1, in a case where the speed of the following vehicle 2 is acquired by the IMU 14, the vehicle speed sensor 15 may not detect the speed of the following vehicle 2 (namely, the vehicle speed sensor 15 may be omitted).

The following control unit 16 sequentially acquires the following target information from the target terminal 17, the object detection information from the optical measurement unit 13, and the following side information from the IMU 14, and thus determines the following target position on a prescribed cycle based on the above-mentioned information.

More specifically, the following control unit 16 sequentially determines the following target position based on a first position and a second position. The first position is the following target position calculated (estimated) based on the following target information, and the second position is a following target position calculated (estimated) based on the object detection information. For example, the first position (current value) can be calculated based on the speed, the acceleration, and the angular velocity of the following target (leading vehicle 3) included in the following target information by referring to the first position at the last time (namely, the value calculated in the last step in a time series). For example, the second position can be calculated based on the distance from the following vehicle 2 to each object, the speed of each object, and the angle (direction from the following vehicle 2) of each object obtained from the object detection information (information about the point group measured for each object). The following control unit 16 may calculate the direction of the following target by using the object detection information.

The following control unit 16 can determine the following target position by calculating a weighted average of the first and second positions. Further, the following control unit 16 can determine the following target position based on the first and second positions by appropriately setting Kalman gain based on an extended Kalman filter according to the importance (weight) of the first position (following target information) and the second position (object detection information).

Further, the following control unit 16 can determine weight values in the weighted average based on a cumulative error about the first position caused by an undermentioned IMU part 33 and an inherent error about the second position caused by the optical measurement unit 13. That is, the following control unit 16 can set each of the weight values of the first and second positions according to the magnitudes of these errors.

Further, the following control unit 16 is configured to send information including the determined following target position (hereinafter referred to as "following position information") to the travel control unit 24. Further, the following control unit 16 can centrally control the operations of the wireless communication unit (an example of the communication unit) 11, the pairing unit 12, the optical measurement unit 13, the IMU 14, and the vehicle speed sensor 15.

For example, a processor (not shown) such as a Central Processing Unit (CPU) executes a prescribed program stored in a memory, and thereby the following control unit 16 executes various processes. Incidentally, the pairing unit 12 can execute various processes similarly to the following control unit 16. At least a part of the pairing unit 12 may be formed integrally with the following control unit 16.

When the following vehicle 2 travels autonomously, the steering device 21 changes a travel direction of the following vehicle 2 by giving a prescribed steering angle to the wheels.

The driving device 22 is configured to output a driving force of the following vehicle 2 by an engine, an electric motor, or the like (not shown).

The brake device 23 is configured to apply the brakes to the following vehicle 2 by using a brake force of the electric motor according to regenerative braking, a brake force of a disc brake (not shown), or the like.

The travel control unit 24 is configured to centrally control the steering device 21, the driving device 22, and the brake device 23 based on the following position information (for example, a current position of the leading vehicle 3) from the following control unit 16, and thereby controlling autonomous traveling (moving operation) of the following vehicle 2. For example, the travel control unit 24 can control a following operation of the following vehicle 2 to follow the leading vehicle 3 so as to maintain a preset inter-vehicle distance between the following vehicle 2 and the leading vehicle 3 based on a distance and speed difference therebetween obtained from the following position information.

For example, a processor (not shown) such as a CPU executes a prescribed program stored in a memory, and thereby the travel control unit 24 executes various processes. The travel control unit 24 may be formed integrally with the following control unit 16.

Incidentally, the configuration of the following target identification system 1 is not limited to the above-mentioned configuration, and thus the following vehicle 2 may move autonomously by using another known configuration as long as the flowing operation of the following vehicle 2 to follow the leading vehicle 3 can be executed based on at least the position of the leading vehicle 3 determined by the following control unit 16.

Next, the target terminal 17 placed on (carried by) the leading vehicle 3 will be described in detail.

The target terminal 17 includes a wireless communication part 31, a pairing part 32, an inertial measurement unit (IMU) part 33, and a terminal control part 34.

The wireless communication part 31 has the same function and configuration as the above-mentioned wireless communication unit 11. The wireless communication part 31 is configured to communicate with the following vehicle 2 (wireless communication unit 11) by using a known wireless communication standard.

The pairing part 32 has the same function as the above-mentioned pairing unit 12. When the wireless communication part 31 starts wireless communication with the following vehicle 2 (wireless communication unit 11), the pairing part 32 executes a pairing process for recognizing the following vehicle 2 as a specific communication partner. The pairing information obtained by the pairing process is sent to the terminal control part 34 and stored in a memory (not shown). The pairing information includes, for example, a secret key, identification information of the communication partner, and information about success/failure of pairing.

The IMU part 33 has the same function and configuration as the above-mentioned IMU 14. The IMU part 33 is configured to sequentially measure the acceleration and the angular velocity of the leading vehicle 3. Also, the IMU part 33 can calculate the speed of the leading vehicle 3 based on the measured acceleration. The following target information of the leading vehicle 3 acquired by the IMU part 33 is sent to the following vehicle 2 via the wireless communication part 31. Further, the IMU part 33 may calculate the following target position based on the acceleration, the angular velocity, and the speed of the leading vehicle 3, and thus transmit the following target position to the following vehicle 2 as the following target information.

Preferably, the target terminal 17 is placed on or near a detected portion of the leading vehicle 3 to be detected by the optical measurement unit 13. For example, the target terminal 17 may be placed on a rear vehicle body of the leading vehicle 3, which will be described later with reference to FIG. 4.

Figure 3:
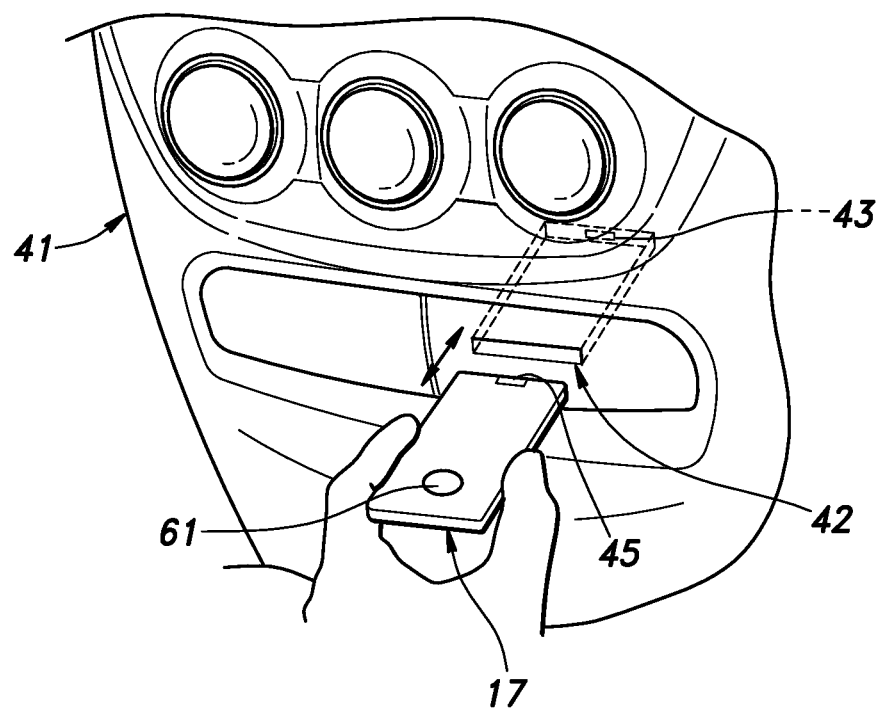
FIG. 3 is a schematic view illustrating a method for connecting a target terminal and a pairing unit according to the first embodiment.

FIG. 3 is a schematic view illustrating a method for connecting the target terminal 17 and the pairing unit 12.

As shown in FIG. 3, a center console (center panel) 41 of the following vehicle 2 is provided with a terminal slot 42. The terminal slot 42 constitutes a part of the pairing unit 12. A slot side terminal 43 is provided inside the terminal slot 42.

On the other hand, a connection terminal 45 is provided on one end side of the target terminal 17. When the target terminal 17 is inserted into the terminal slot 42, the connection terminal 45 provided on an insertion side (tip end side in an insertion direction) of the target terminal 17 is connected to the slot side terminal 43. Accordingly, the target terminal 17 is connected to the pairing unit 12 by wire (namely, the target terminal 17 and the pairing unit 12 can communicate with each other). In this state, the pairing unit 12 can execute the above-mentioned pairing process.

For example, the target terminal 17 may be arranged in the terminal slot 42 (namely, in a state where the pairing process is completed) before the user selects the following target, and may be taken out from the terminal slot 42 when the user selects the following target. The user can place the target terminal 17, which has been taken out from the terminal slot 42, on the desired following target.

The target terminal 17 is placed on (carried by) the leading vehicle 3 in a state where the target terminal 17 is detachably held by a terminal holder 51 (see FIG. 2), which is detachably attached to the rear vehicle body of the leading vehicle 3. Alternatively, the target terminal 17 may be placed on the leading vehicle 3 by various other methods on condition that the target terminal 17 can be fixed to the leading vehicle 3. For example, the target terminal 17 may directly adhere to the rear vehicle body of the leading vehicle 3. Alternatively, the target terminal 17 may be fixed to an appropriate place inside a rear vehicle cabin of the leading vehicle 3. Preferably, the target terminal 17 can be removed from (namely, collected from) the leading vehicle 3 after the following operation of the following vehicle 2 to follow the leading vehicle 3 is completed.

In the pairing process, the target terminal 17 and the pairing unit 12 may communicate with each other not by the abovementioned wired communication but by wireless communication. For example, in a case where both the target terminal 17 and the pairing unit 12 are equipped with a known short-range wireless communication function (for example, an iBeacon (registered trademark) function), the target terminal 17 and the pairing unit 12 can communicate with each other by using such a function.

The target terminal 17 may communicate with the pairing unit 12 via the wired or wireless communication in a state where the target terminal 17 is fitted in an appropriate part (recess) inside the vehicle cabin or placed on an appropriate part in the vehicle cabin. Preferably, in a case where the target terminal 17 communicates with the pairing unit 12 via the wireless communication, the target terminal 17 is placed near the pairing unit 12 during the pairing process.

Figure 4:
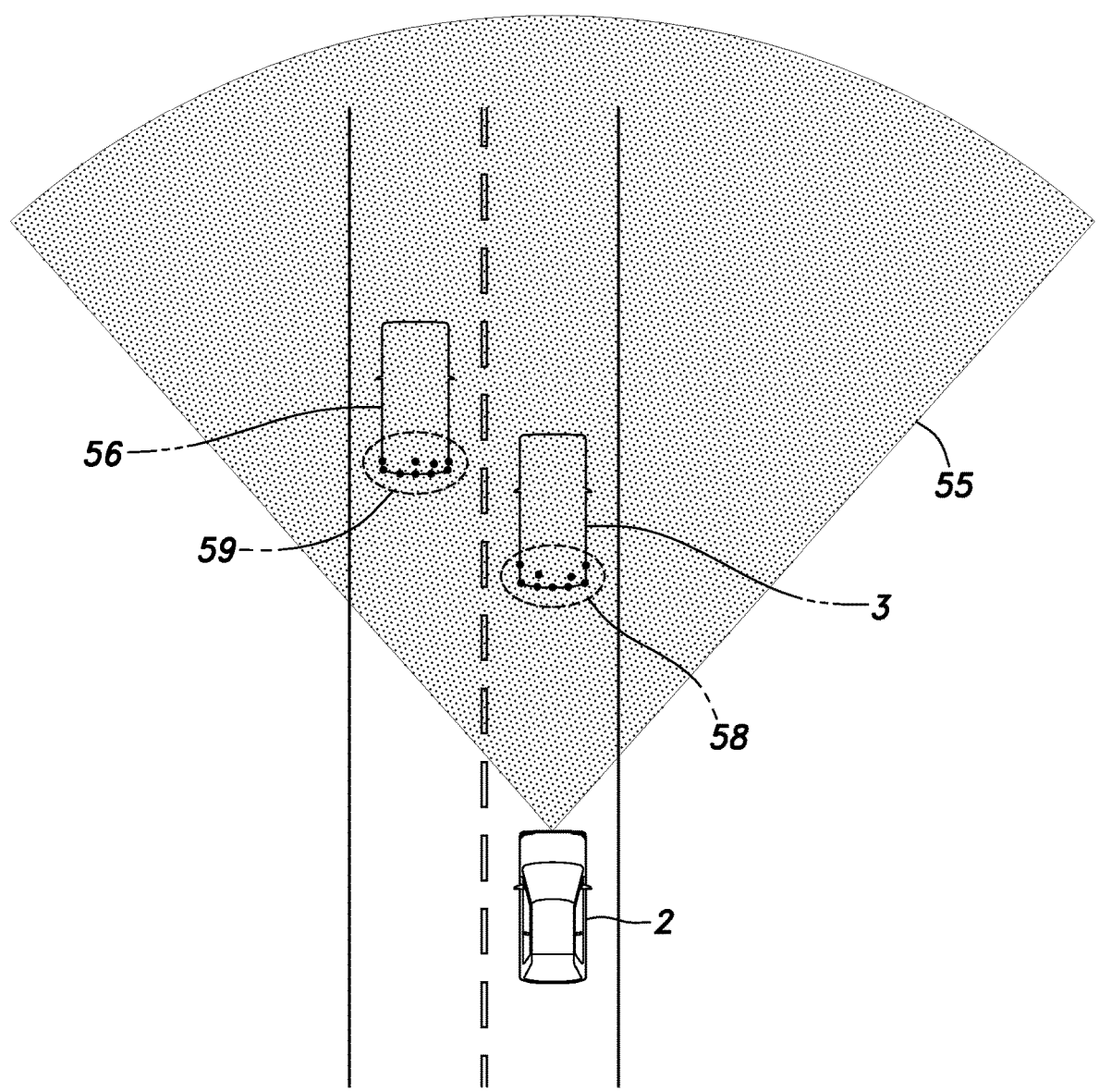
FIG. 4 is an explanatory view showing a method for selecting the following target in a case where plural following target candidates are detected.

FIG. 4 is an explanatory view showing a method for selecting the following target in a case where the optical measurement unit 13 detects plural candidates for the following target (hereinafter referred to as "following target candidate(s)").

As shown in FIG. 4, the following control unit 16 can convert a result of the three-dimensional measurement by the optical measurement unit 13 (namely, the point group detected by the optical measurement unit 13) into a point group on a two-dimensional coordinate perpendicular to the vertical direction of the following vehicle 2 (substantially parallel to the road surface).

During the measurement by the optical measurement unit 13, a prescribed measurement area 55 (actually, a prescribed measurement space) is formed by scanning laser light in a moving direction of the following vehicle 2. FIG. 4 shows an example in which two objects (the leading vehicle 3 and the other vehicle 56) are detected in the moving direction of the following vehicle 2.

The object detection information (for example, the measurement result) which the following control unit 16 acquires from the optical measurement unit 13 includes the data of point groups 58, 59, which mainly correspond to the rear parts (rear surfaces) of each of the leading vehicle 3 and the other vehicle 56. The following control unit 16 can detect the point groups 58, 59 as objects present in a forward direction (namely, the following target candidates) by clustering the data of the point groups 58, 59 measured by the optical measurement unit 13 by using a known method.

By the way, the following control unit 16 cannot recognize which of the two objects is the following target (namely, the leading vehicle 3) only by detecting the two objects based on the point groups 58, 59. The following control unit 16 calculates a distance between a position of the leading vehicle 3 (namely, the first position) estimated (provisionally determined) based on the following target information from the target terminal 17 and a position of each object (for example, a centroid of each point group 58, 59) obtained from a coordinate position of each point group 58, 59, and thus can determine the point group 58, 59 having a smaller distance as the following target.

In the example shown in FIG. 4, the following control unit 16 can estimate the position of the object obtained based on the point group 58 as the following target position (namely, the second position) based on the object detection information from the optical measurement unit 13.

Incidentally, even if three or more objects are present in the moving direction of the following vehicle 2, the following control unit 16 can determine one object (one point group) as the leading vehicle 3 by using a method similar to the above-mentioned method. Further, at least a part of the above-mentioned data processing of the point groups 58, 59 by the following control unit 16 may be executed by the optical measurement unit 13.

Figure 5:
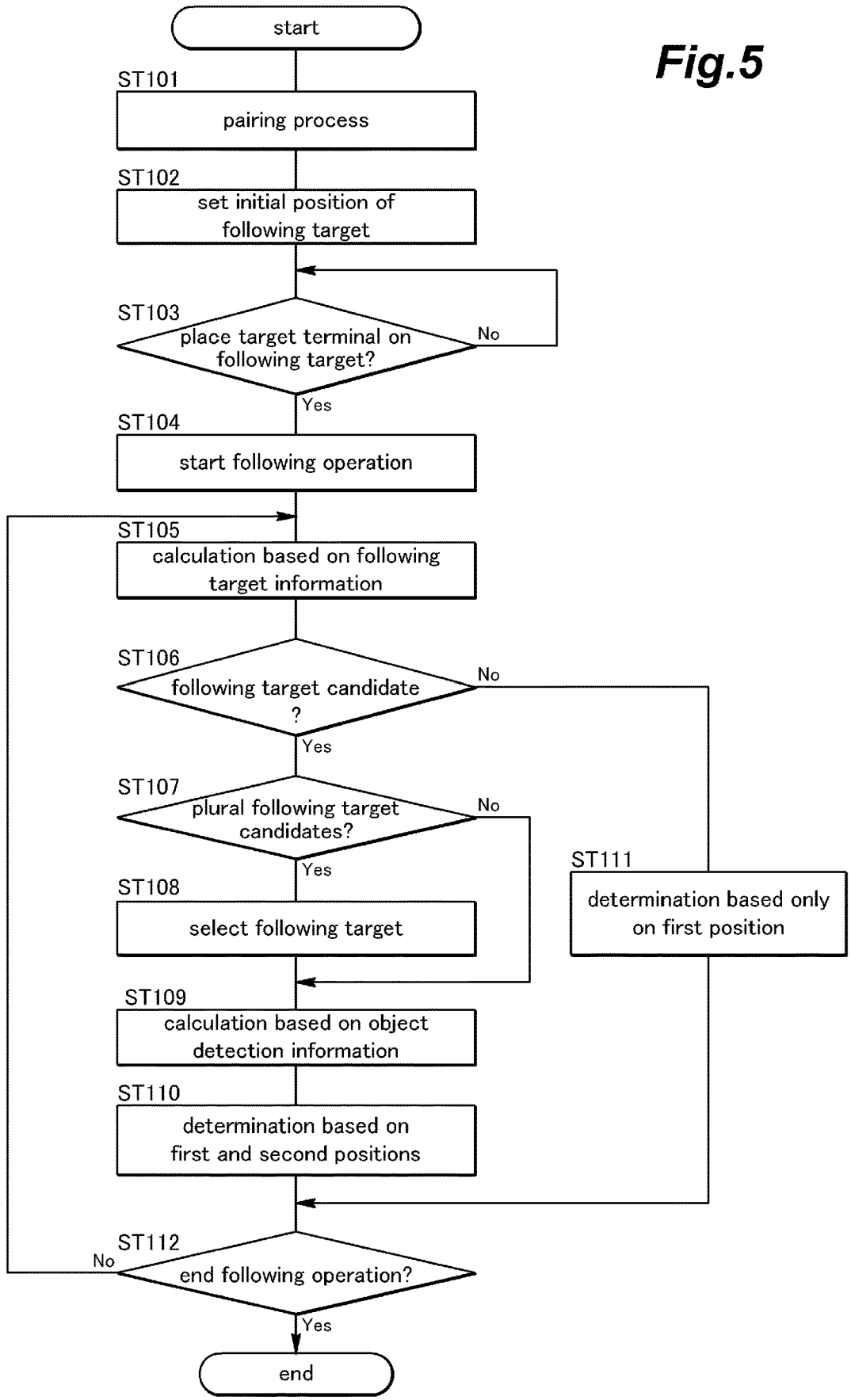
FIG. 5 is a flow chart showing a flow of a following target position determination process according to the first embodiment.

FIG. 5 is a flow chart showing a flow of a following target position determination process in the following target identification system 1.

First, the user performs the pairing process of the target terminal 17 and the pairing unit 12 of the following vehicle 2 before placing the target terminal 17 on the leading vehicle 3 (ST101). Incidentally, as described above with reference to FIG. 3, this pairing process may be completed in advance.

When the pairing process is completed, the following control unit 16 sets an initial position of the leading vehicle 3 (the target terminal 17) based on the current position of the following vehicle 2 (ST102). For example, the following control unit 16 can set a current position of the following vehicle 2 at a time when the pairing process is completed as the initial position of the leading vehicle 3. At this time, the following control unit 16 can calculate the current position of the following vehicle 2 based on the following side information from the IMU 14, for example. Alternatively, the following control unit 16 may acquire the current position of the following vehicle 2 from a Global Positioning System (GPS) (not shown) mounted on the following vehicle 2. During a period after the step ST102 is executed and before the target terminal 17 is removed from the following vehicle 2 and then placed on the leading vehicle 3, the following control unit 16 can track the target terminal 17 (namely, the following control unit 16 can sequentially acquire a current position of the target terminal 17) based on the information from the IMU 33 part (the information corresponding to the following target information).

Next, the user places the target terminal 17 on the leading vehicle 3 (ST103: Yes), and thus the following operation of the following vehicle 2 to follow the leading vehicle 3 is started (ST104).

For example, the target terminal 17 may be provided with a placement completion button 61 (see FIG. 3) to be operated (pressed) by the user after the user places the target terminal 17 on the following target. When the user operates the placement completion button 61, a signal indicating that the placement of the target terminal 17 is completed may be sent from the target terminal 17 to the following vehicle 2 (the following control unit 16). Thereby, the following vehicle 2 can easily recognize the timing to start the following operation (an example of a moving operation). The following control unit 16 may set the position of the target terminal 17 at a time when the placement completion button 61 is operated by the user as the initial position of the leading vehicle 3 instead of executing the above-mentioned step ST102. Alternatively, the following control unit 16 may set the initial position of the leading vehicle 3 by using the object detection information measured by the optical measurement unit 13 when the user operates the placement completion button 61.

Next, the following control unit 16 calculates (estimates) the following target position (the first position) based on the following target information from the target terminal 17 (ST105).

Next, the following control unit 16 determines whether the following target candidate is present (ST106) and whether the plural following target candidates are present (ST107) based on the object detection information from the optical measurement unit 13. In a case where the following target candidate is present (ST106: Yes), and further the plural following target candidates are present (ST107: Yes), the following control unit 16 selects one of those following target candidates as the following target as described above with reference to FIG. 4 (ST108).

Next, the following control unit 16 calculates (estimates) the following target position (the second position) based on the object detection information from the optical measurement unit 13 (ST109).

Then, the following control unit 16 determines the following target position based on the first and second positions (ST110). For example, in this step ST110, the following target position can be determined by calculating the weighted average of the first and second positions as described above.

In a case where the following target candidate is not detected at all due to a measurement error of the optical measurement unit 13 or in a case where the following target is not included in the following target candidates due to the occlusion or the like (ST106: No), the following control unit 16 determines the following target position based only on the first position (ST111). In this step ST111, the following control unit 16 can determine the first position itself as the following target position. Alternatively, the following control unit 16 can determine the first position corrected based on the following target position at the last time (the previous position) as the following target position (the current position).

Incidentally, in step ST106, in a case where the distance between the first and second positions is equal to or greater than a prescribed threshold value, the following control unit 16 can determine that the following target candidates detected by the optical measurement unit 13 do not include the following target (ST106: No).

The above-mentioned sequential operations (steps ST105 to ST111) after the start of the following operation in step ST104 are repeatedly executed until the following operation ends (ST112: Yes).

As time goes by, a cumulative error accumulates in the following target position (the first position) estimated based on the following target information from the target terminal 17 (the IMU part 33). Thus, in a case where step ST110 is executed in the next sequence (namely, in the next step in a time series) of step ST111, (namely, in a case where the distance between the first and second positions becomes less than the prescribed threshold value after becoming equal to or greater than the prescribed threshold value), the following control unit 16 may reduce the weight value of the first position in the above-mentioned weighted average as compared with the last time (namely, the last step in a time series). Accordingly, it is possible to reduce the influence of the cumulative error caused by the IMU part 33 on the determination of the following target position.

For example, the following target identification system 1 according to the first embodiment can be applied to a driving agency, vehicle transportation, and vehicle allocation (car sharing, vehicle transfer to dealers, and the like). Also, when three or more vehicles travel in a platoon, the following vehicle 2 can be a leading vehicle of another following vehicle (not shown) that follows the following vehicle 2.

According to the following target identification system 1 as described above, in a case where the following vehicle 2 moves autonomously to follow the leading vehicle 3, the portable target terminal 17 is placed on (carried by) another desired moving object (namely, the leading vehicle 3). Thus, it is possible to provide a user with increased flexibility in selecting the following target.

Second Embodiment

Figure 6:
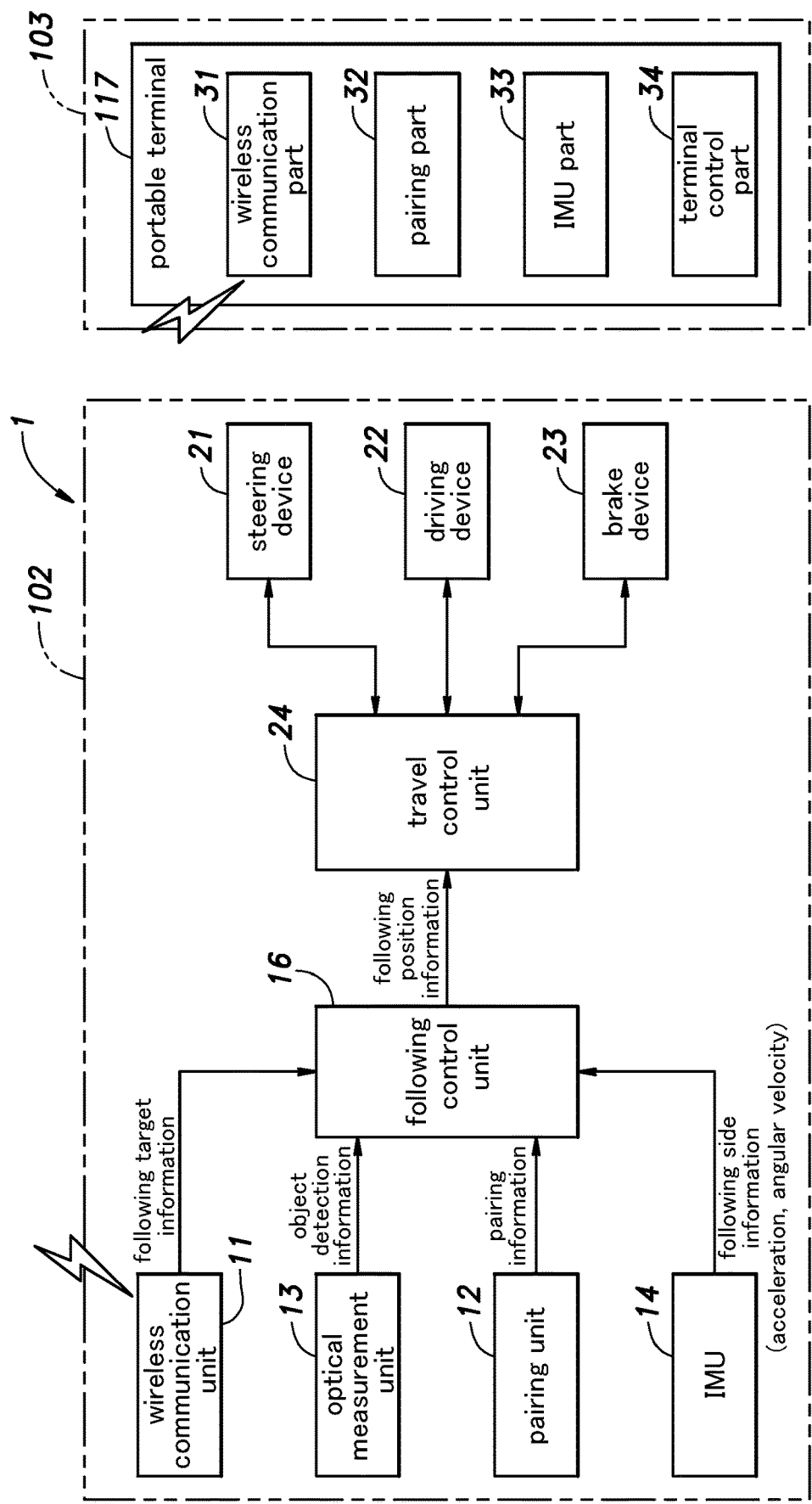
FIG. 6 is a block diagram of a following target identification system according to a second embodiment.
Figure 7:
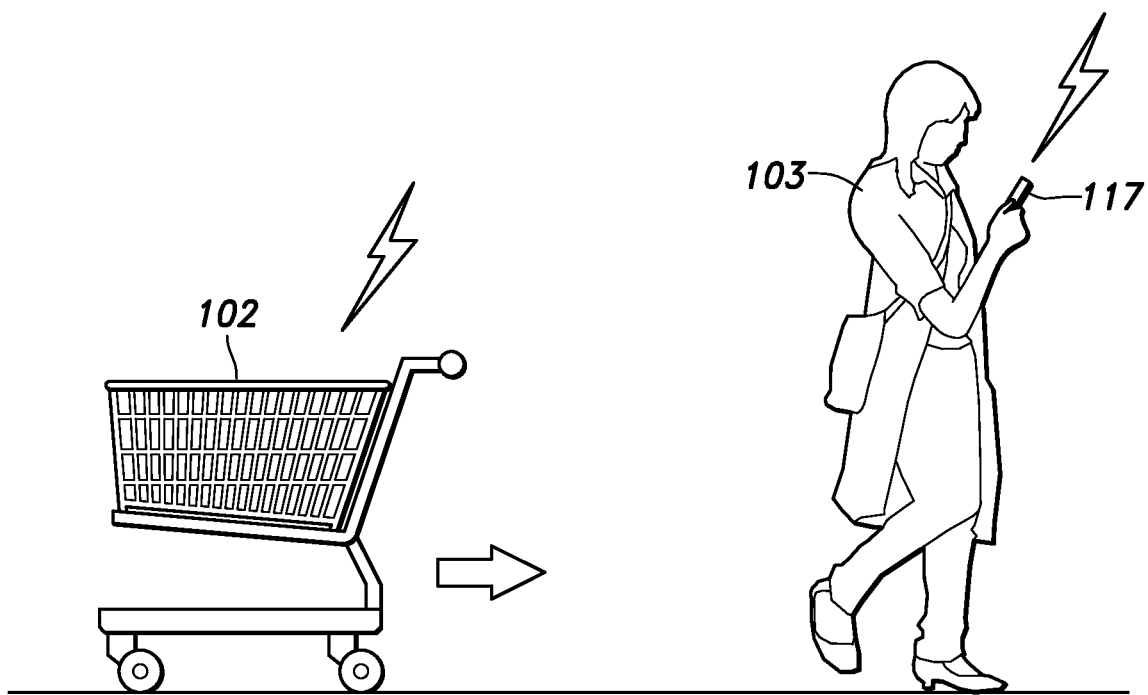
FIG. 7 is an explanatory view showing a moving object and its following target to which the following target identification system according to the second embodiment is applied.

FIG. 6 is a block diagram of a following target identification system 1 according to a second embodiment. FIG. 7 is an explanatory view showing a moving object and its following target (namely, a target to be followed by the moving object) to which the following target identification system 1 according to the second embodiment is applied. In the drawings according to the second embodiment, the same components as those of the following target identification system 1 according to the above-mentioned first embodiment are provided with the same reference numerals as the first embodiment. Further, in the following target identification system 1 according to the second embodiment, matters that are not particularly mentioned below can be the same as those of the following target identification system 1 according to the above-mentioned first embodiment.

In the following target identification system 1 according to the second embodiment, a shopping cart (an example of a cart) 102 as the moving object is configured to move autonomously (namely, travel autonomously in a store) to follow a user (an example of a person) 103 as the following target using the shopping cart 102 (see FIG. 7).

As shown in FIG. 6, in the following target identification system 1 according to the second embodiment, the shopping cart 102 has a configuration similar to that of the following vehicle 2 according to the above-mentioned first embodiment, except that the shopping cart 102 is not provided with the vehicle speed sensor 15. The shopping cart 102 can move autonomously, like the following vehicle 2 according to the above-mentioned first embodiment.

Preferably, in the following target identification system 1 according to the second embodiment, a camera is used as the optical measurement unit 13 instead of the device using the LIDAR technology. Further, in the following target identification system 1 according to the second embodiment, the information (the images in the store and the like) captured by plural security cameras installed in appropriate places in the store can be used instead of or in addition to the information captured by the camera mounted on the shopping cart 102.

Further, in the following target identification system 1 according to the second embodiment, a portable terminal (an example of an information generation terminal) 117 is placed on (carried by) the user 103 instead of the target terminal 17 according to the above-mentioned first embodiment. Although the portable terminal 117 consists of a smartphone carried by the user 103 in the second embodiment, the portable terminal 117 is not limited to the smartphone and may be another information terminal (for example, a smart watch) having functions similar to those of the smartphone.

Figure 8:
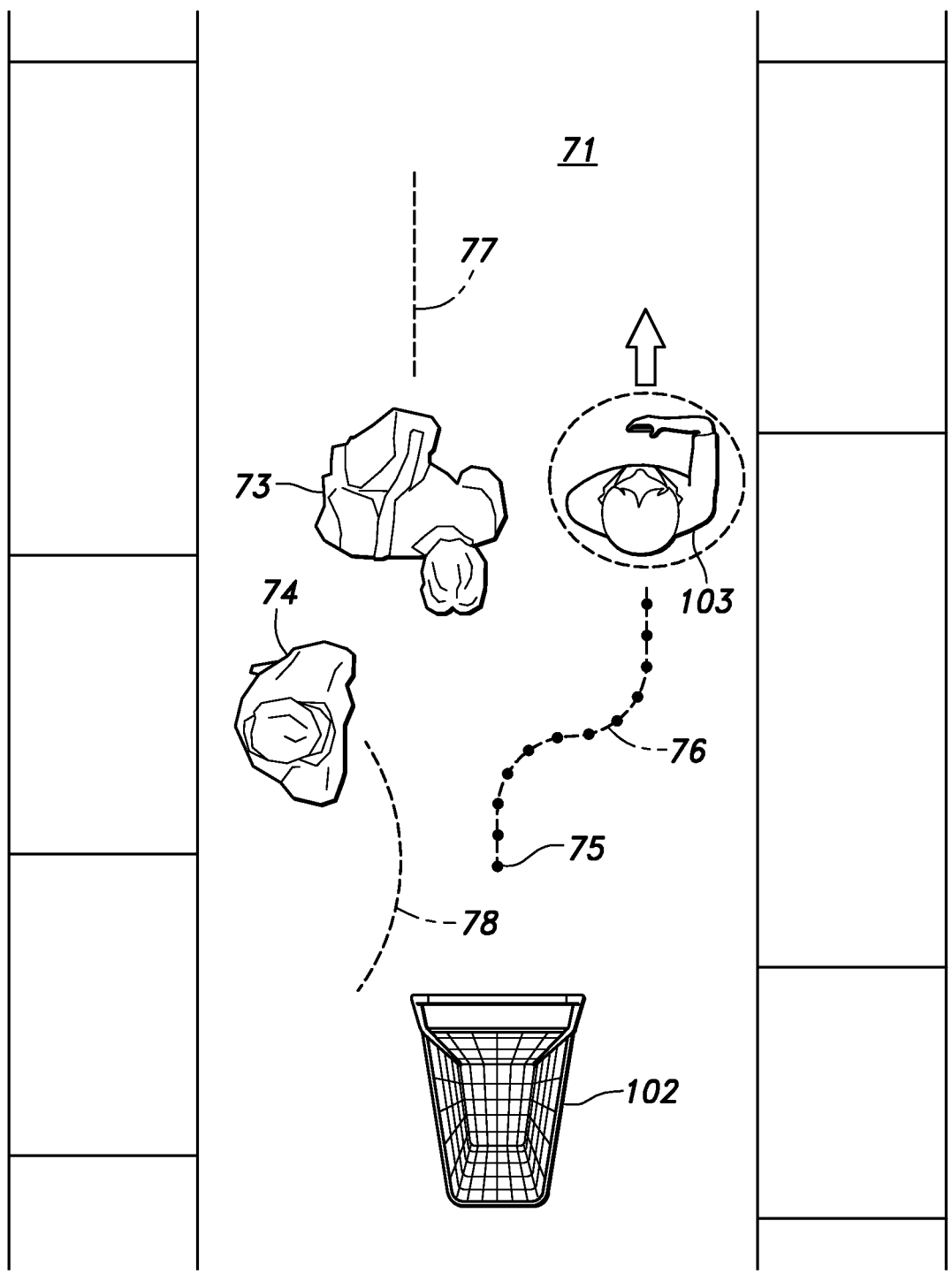
FIG. 8 is an explanatory view showing a method for selecting the following target in a pairing process according to the second embodiment.

FIG. 8 is an explanatory view showing a method for selecting the following target in a pairing process.

Preferably, the user 103 performs the pairing process of the portable terminal 117 and the pairing unit 12 of the shopping cart 102 when starting to use the shopping cart 102. For example, the user performs the pairing process in a state of bringing the portable terminal 117 close to the pairing unit 12 of the shopping cart 102. At this time, the pairing unit 12 and the portable terminal 117 can mutually exchange information by wireless communication.

On the other hand, in a case where the user 103 moves away from the shopping cart 102 after the pairing process is completed, as shown in FIG. 8, not only the user 103 but also plural persons 73, 74 may be present in a passage 71 in the store where the user 103 is moving. In such a case, the shopping cart 102 may not be able to identify the user 103 as the following target or may erroneously recognize a shopper other than the user 103 as the following target.

Considering such a situation, after the pairing process is completed, the following control unit 16 compares the moving trajectory 75 of the user 103 acquired based on the following target information from the portable terminal 117 with the moving trajectories 76, 77, 78 of the respective objects (namely, the user 103 and the persons 73, 74) acquired based on the object detection information from the optical measurement unit 13. Thereby, the following control unit 16 can select the object with the highest matching rate of the moving trajectory (in FIG. 8, the user 103 corresponding to the moving trajectory 76) as the following target.

Alternatively, the following control unit 16 compares the movement start timing and the movement start direction of the user 103 acquired based on the following target information from the portable terminal 117 with those of the respective objects acquired based on the object detection information from the optical measurement unit 13. Thereby, the following control unit 16 may select the object with the highest matching rate of the movement start timing and the movement start direction as the following target.

Figure 9:
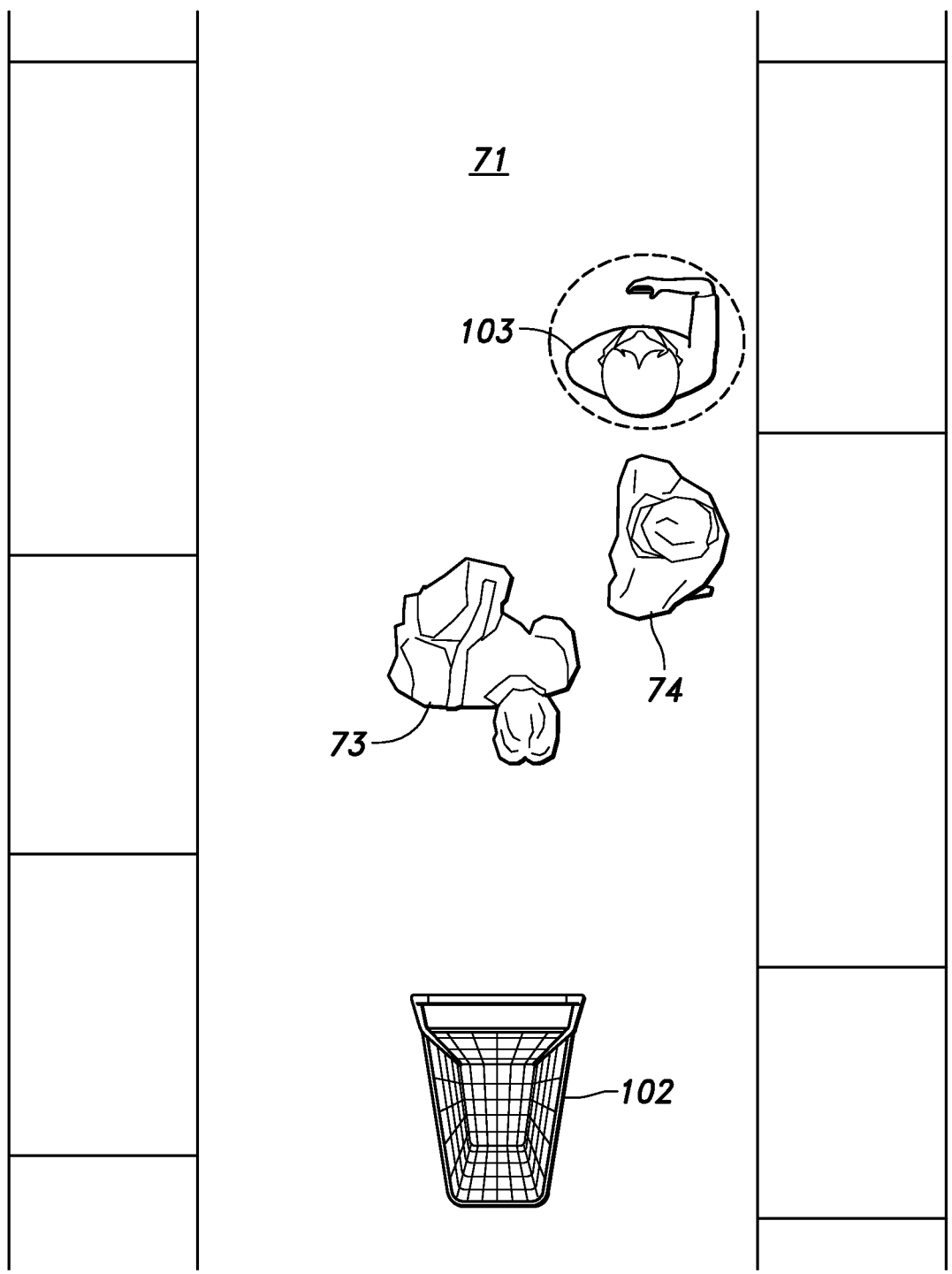
FIG. 9 is an explanatory view showing a method for selecting the following target when a store is crowded according to the second embodiment.
Figure 10A:
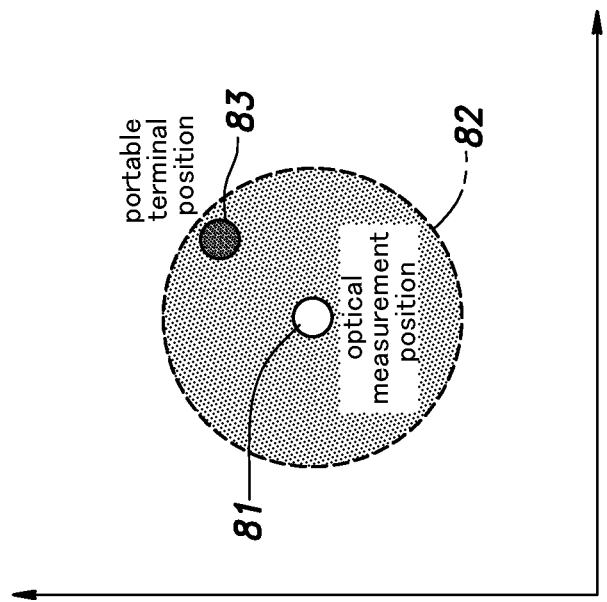
FIG. 10A is an explanatory view showing a method for determining whether an optical measurement unit erroneously recognizes the following target according to the second embodiment, this view shows a case where a following target position calculated based on the following target information from a portable terminal is outside a margin of error around an optical measurement position.
Figure 10B:
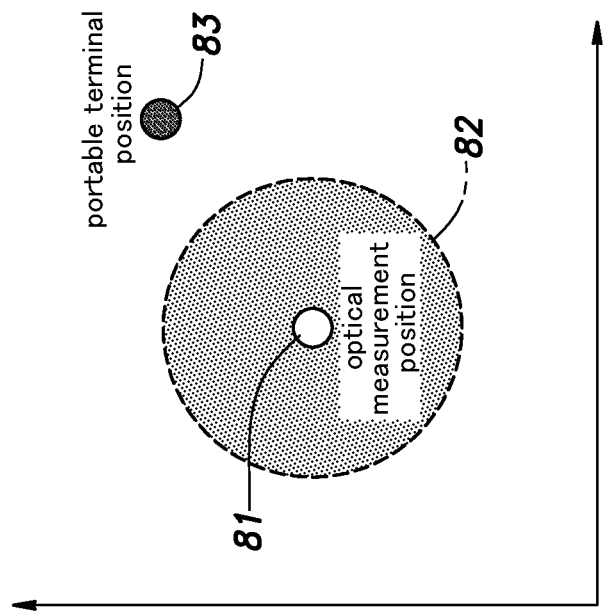
FIG. 10B is explanatory view showing a method for determining whether an optical measurement unit erroneously recognizes the following target according to the second embodiment, this view shows a case where the portable terminal position is within the margin of error around the optical measurement position.
Figure 11A:
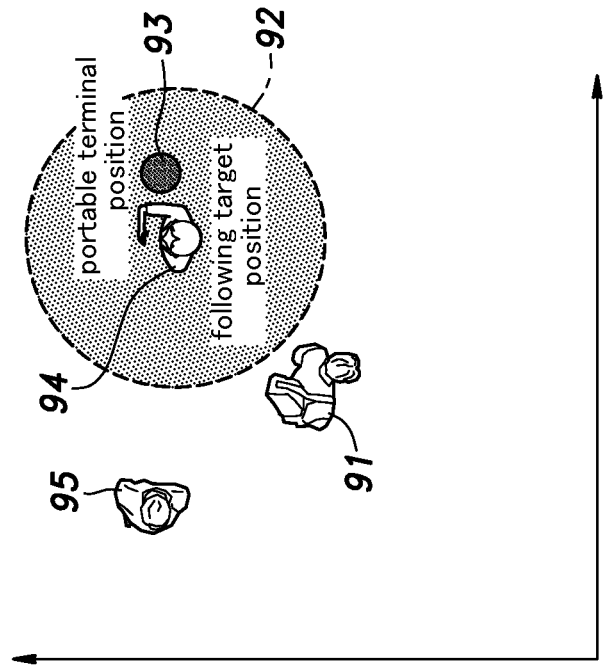
FIG. 11A is an explanatory views showing a method for changing the following target of the optical measurement unit according to the second embodiment, this view shows a case where the following target position calculated based on the following target information from the portable terminal is outside the normal range around the following target position.
Figure 11B:
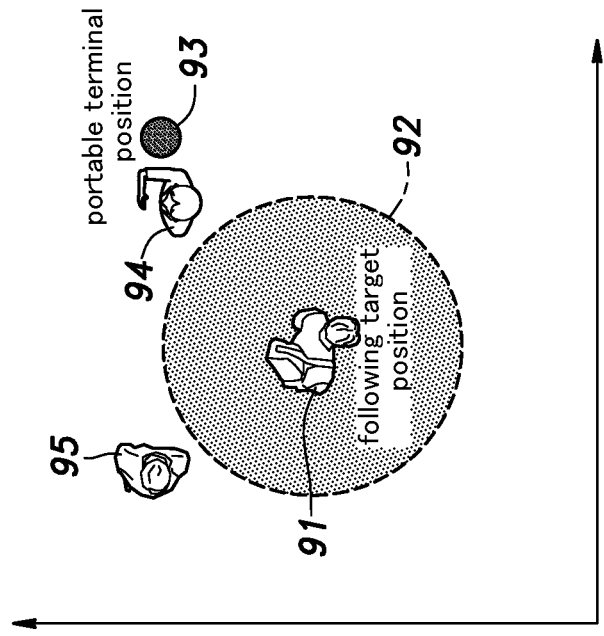
FIG. 11B is an explanatory views showing a method for changing the following target of the optical measurement unit according to the second embodiment, this view shows the following control unit changing the following target of the optical measurement unit from a person to a closest person included in the detected persons other than the person.

FIG. 9 is an explanatory view showing a method for selecting the following target when the store is crowded. FIGS. 10A and 10B are explanatory views showing a method for determining whether the optical measurement unit 13 erroneously recognizes the following target. FIGS. 11A and 11B are explanatory views showing a method for changing the following target of the optical measurement unit 13.

As shown in FIG. 9, after the shopping cart 102 starts to follow the user 103, not only the user 103 but also plural persons (for example, other shoppers) 73, 74 may be present in the passage 71 in the store where the user 103 is moving. In such a case, as shown in FIG. 9, when the user 103 disappears into the persons 73, 74 (namely, the crowd) or the occlusion of the user 103 is caused by the persons 73, 74, the user 103 may not be detected by the optical measurement unit 13.

Considering such a situation, as shown in FIGS. 10A and 10B, the following control unit 16 determines whether the optical measurement unit 13 erroneously recognizes the following target by referring to the position of the user 103 acquired based on the following target information from the portable terminal 117 (namely, by regarding the position of the user 103 acquired based on the following target information as a correct position).

The following control unit 16 presets an allowable margin of error (for example, a circular or elliptical area) 82 around the following target position 81 calculated based on the object detection information from the optical measurement unit 13 (hereinafter referred to as "optical measurement position 81"). As shown in FIG. 10A, in a case where the following target position 83 calculated based on the following target information from the portable terminal 117 (hereinafter referred to as "portable terminal position 83") is outside the margin of error 82 around the optical measurement position 81, the following control unit 16 determines that the optical measurement unit 13 erroneously recognizes the following target.

On the other hand, as shown in FIG. 10B, in a case where the portable terminal position 83 is within the margin of error 82 around the optical measurement position 81, the following control unit 16 determines that the optical measurement unit 13 normally recognizes the following target.

Further, as shown in FIGS. 11A and 11B, the following control unit 16 can change the following target of the optical measurement unit 13 by referring to the position of the user 103 acquired based on the following target information from the portable terminal 117.

For example, the following control unit 16 sets a normal range (for example, a circular or elliptical area) 92 around the following target position (a position (for example, a centroid) of the person 91 that is erroneously recognized as the user 103). As shown in FIG. 11A, in a case where the following target position 93 calculated based on the following target information from the portable terminal 117 (hereinafter referred to as "portable terminal position 93") is outside the normal range 92 around the following target position, the following control unit 16 determines that the optical measurement unit 13 recognizes the wrong person 91 as the following target.

In this case where the optical measurement unit 13 recognizes the wrong person 91 as the following target, as shown in FIG. 11B, the following control unit 16 changes the following target of the optical measurement unit 13 from the person 91 to the closest person 94 (a person closest to the portable terminal position 93) included in the detected persons 94 and 95 other than the person 91. Accordingly, it is possible to prevent the optical measurement unit 13 from recognizing the wrong person 91 (object) as the following target.

Figure 12:
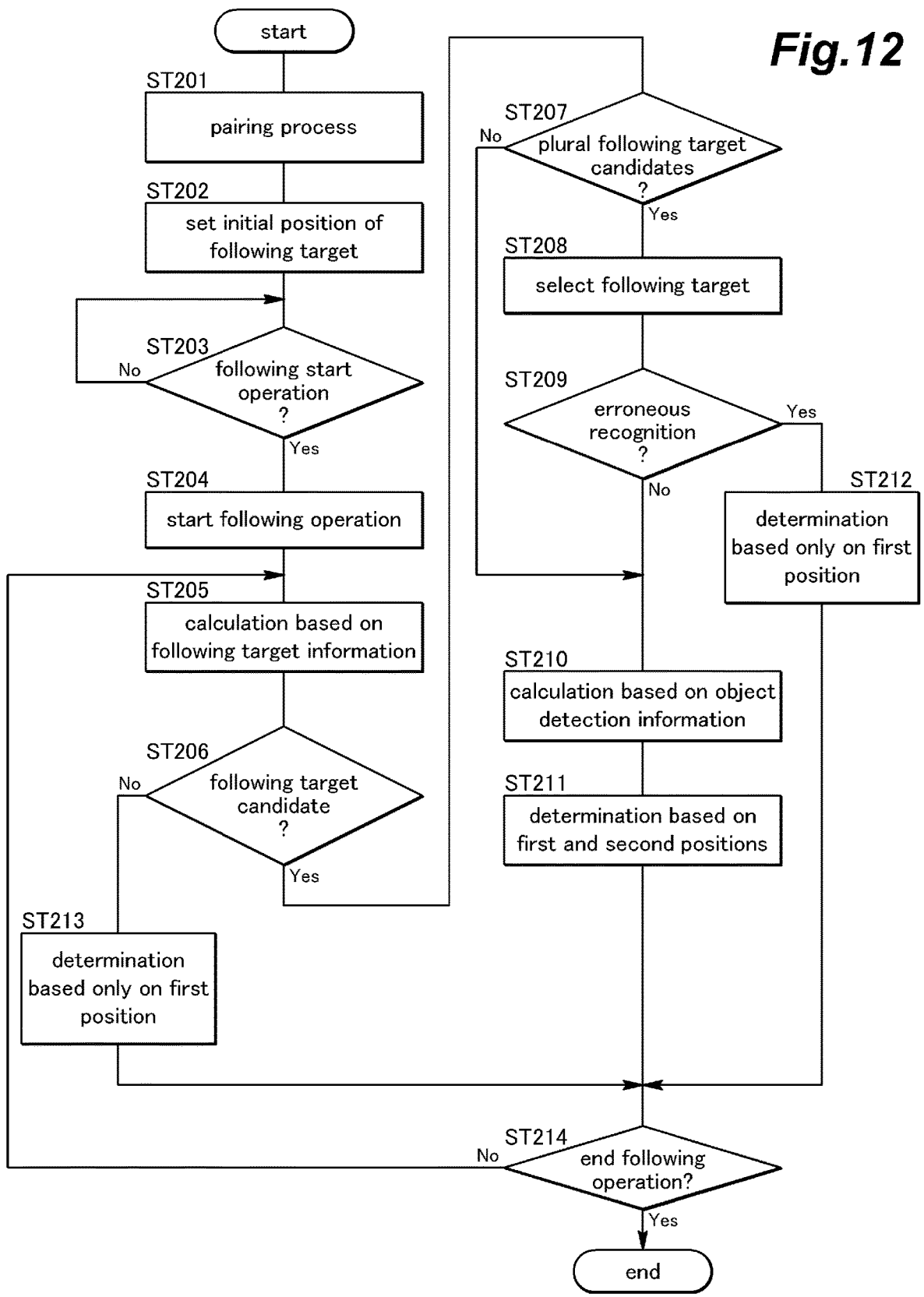
FIG. 12 is a flow chart showing a flow of a following target position determination process according to the second embodiment.

FIG. 12 is a flow chart showing a flow of a following target position determination process in the following target identification system 1 according to the second embodiment.

First, the user performs the pairing process of the portable terminal 117 placed on (carried by) the user and the pairing unit 12 of the shopping cart 102 (ST201).

When the pairing process is completed, the following control unit 16 sets the current position of the shopping cart 102 as the initial position of the user 103 (portable terminal 117) (ST202).

Next, the user 103 performs a following start operation on the portable terminal 117 (ST203: Yes), and thereby the shopping cart 102 starts the following operation to follow the user 103 (ST204). Incidentally, an application program for using the following target identification system 1 is installed in the portable terminal 117 in advance. The user 103 can perform various settings and give various instructions about the following operation of the shopping cart 102 (for example, the following start operation) by using the application program.

Next, the following control unit 16 executes steps ST205 to ST208, which are similar to steps ST105 to ST108 in the first embodiment (see FIG. 5).

Next, the following control unit 16 determines whether the optical measurement unit 13 erroneously recognizes the following target, as described above with reference to FIGS. 10A and 10B (ST209).

In a case where the optical measurement unit 13 does not erroneously recognize the following target (ST209: No), the following control unit 16 calculates (estimates) the following target position based on the object detection information from the optical measurement unit 13 (ST210).

Thereafter, the following control unit 16 determines the following target position based on the first and second positions (ST211).

On the other hand, in step ST209, in a case where the optical measurement unit 13 erroneously recognizes the following target (ST209: Yes), the following control unit 16 determines the following target position based only on the first position (ST212).

In a case where the following target candidate is not detected at all due to a measurement error of the optical measurement unit 13 or in a case where the following target is not included in the following target candidates due to the occlusion or the like (ST206: No), the following control unit 16 determines the following target position based only on the first position (ST213).

The above-mentioned sequential operations (steps ST205 to ST213) after the start of the following operation in step ST204 are repeatedly executed until the following operation ends (ST214: Yes).

Figure 13:
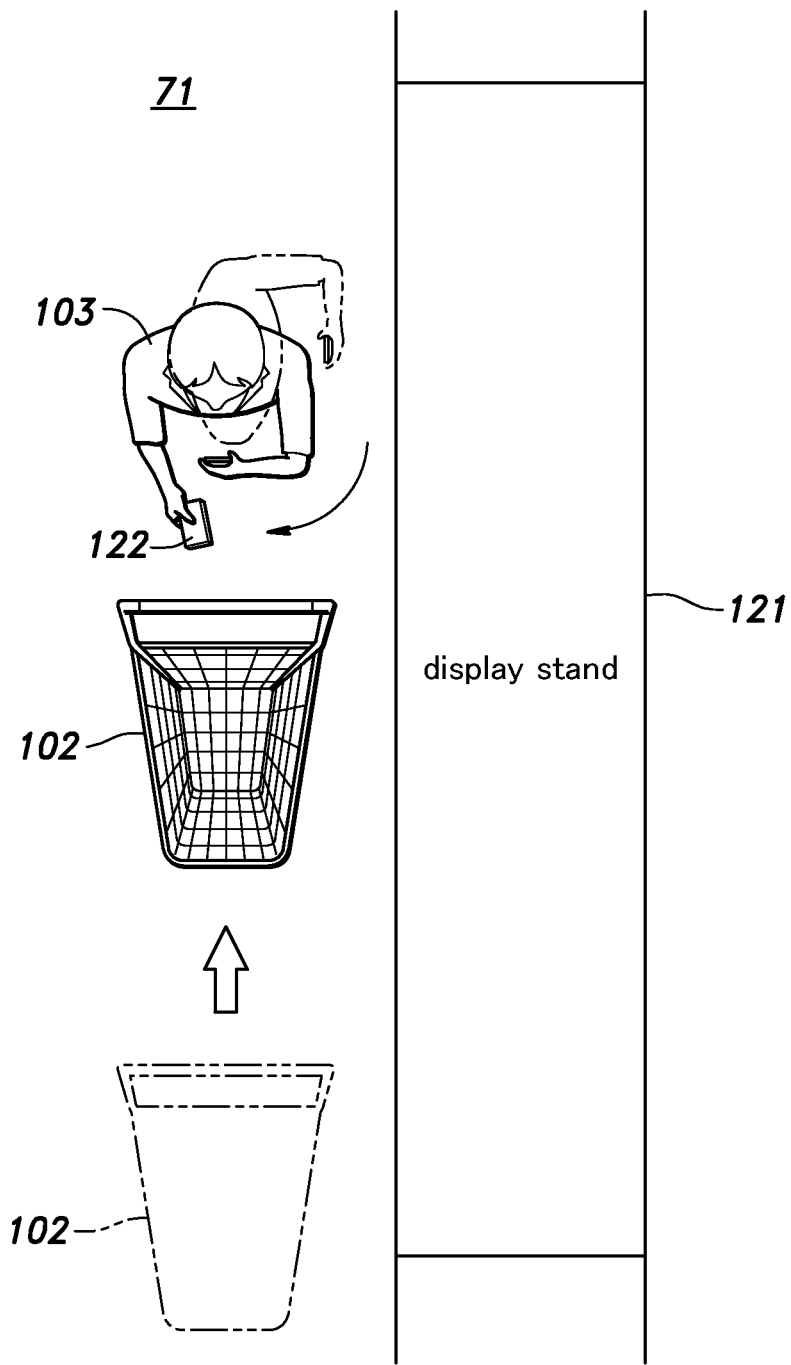
FIG. 13 is an explanatory view showing a first example of a following operation according to a postural change of a user according to the second embodiment.
Figure 14:
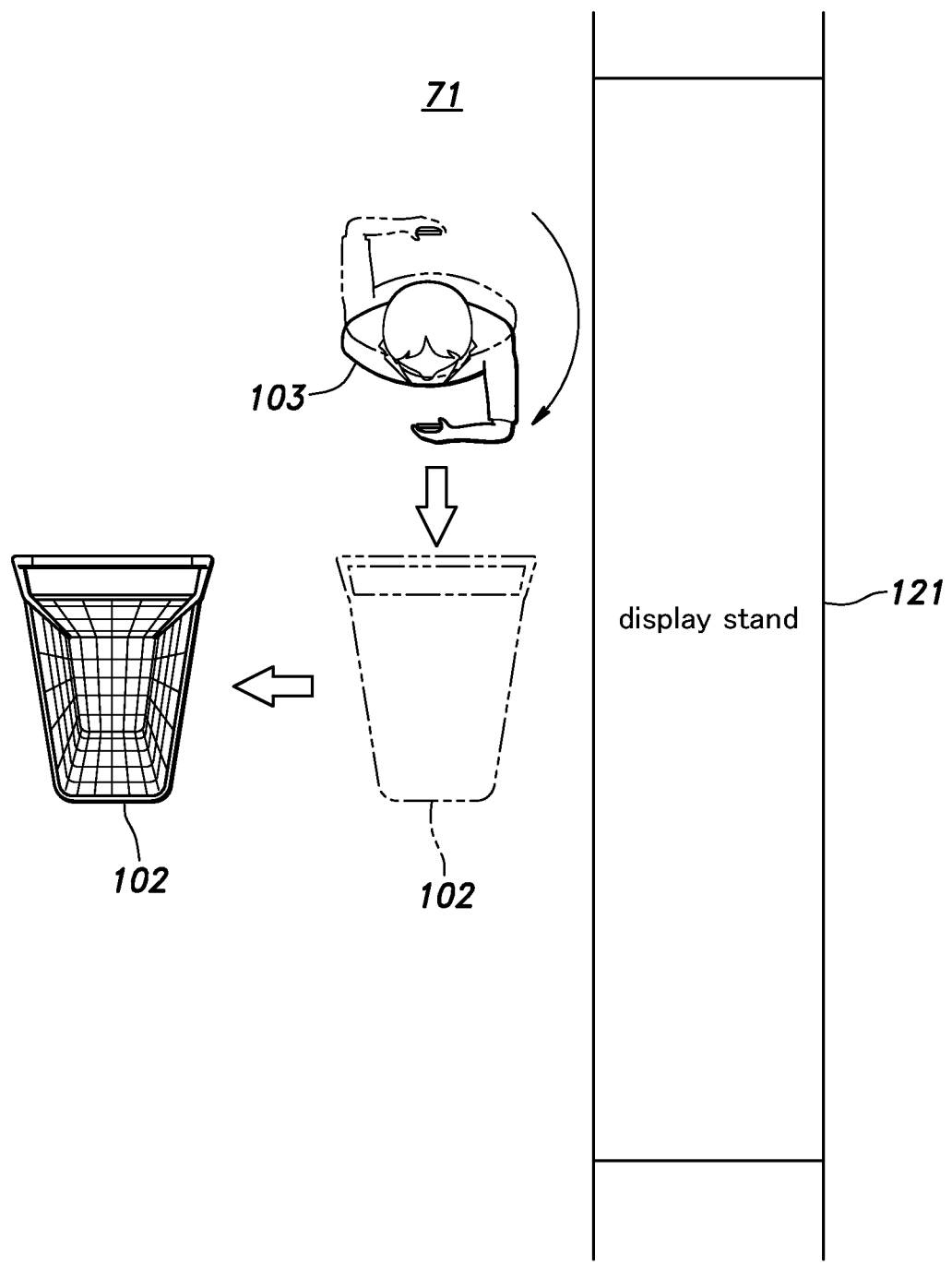
FIG. 14 is an explanatory view showing a second example of the following operation according to the postural change of the user according to the second embodiment.

FIGS. 13 and 14 are explanatory views showing the first example and the second example of the following operation according to a postural change of a user, respectively.

After the shopping cart 102 starts to follow the user 103, as shown in FIG. 13, in the passage 71 facing a display stand 121 in the store, the user 103 who has picked up a commodity 122 from the display stand 121 intends to load the commodity 122 into the shopping cart 102. In this case, as shown in FIG. 13, the user 103 having faced the display stand 121 makes a change in direction toward the shopping cart 102 that follows the user 103 from behind.

At this time, in a case where the following control unit 16 determines that the user 103 has stopped for a prescribed period (namely, the user has performed an operation for selecting the commodity 122 from the display stand 121), the following control unit 16 estimates the postural change of the user 103 by calculating the changing amount of a body angle of the user 103 based on the following target information (more specifically, the angular velocity around a central axis of the body of the user 103) from the portable terminal 117. Then, in a case where the changing amount of the body angle of the user 103 is equal to or greater than a prescribed threshold value (first threshold value), the following control unit 16 determines that the user 103 has made a specific change in direction (namely, the user 103 has performed an operation to load the commodity into the cart) and thus instructs the travel control unit 24 to make the shopping cart 102 approach the user 103. According to this instruction, the travel control unit 24 controls the following operation of the shopping cart 102 to follow the user 103. In this case, the threshold value of the changing amount of the body angle is set to 90°, for example.

Incidentally, in a case where the angular velocity included in the following target information from the portable terminal 117 (more specifically, the angular velocity around the central axis of the body of the user 103) is greater than a prescribed threshold value, the following control unit 16 may determine that the user 103 has performed the operation to load the commodity into the cart.

Also, as shown in FIG. 14, in the passage 71 facing the display stand 121 in the store, the user 103 may make a change in direction toward the shopping cart 102 that follows the user 103 from behind to move to another area in the store.

In such a case, the following control unit 16 estimates the postural change of the user 103, like in the above-mentioned case shown in FIG. 13. In a case where the changing amount of the body angle of the user 103 is equal to or greater than another prescribed threshold value (second threshold value), the following control unit 16 determines that the user 103 has made a specific change in direction (namely, the user 103 has made a U-turn), and instructs the travel control unit 24 to stop the movement of the shopping cart 102. Incidentally, the following control unit 16 may instruct the travel control unit 24 to move the shopping cart 102 such that the moving path of the user 103 after the change in direction is cleared (namely, to move the shopping cart 102 laterally). According to this instruction, the travel control unit 24 controls the following operation of the shopping cart 102 to follow the user 103. In this case, the threshold value of the changing amount of the body angle is set to be greater than the first threshold value (namely, the threshold value set for the operation to load the commodity into the cart 103), and is set to 180°, for example.

Incidentally, in a case where the angular velocity included in the following target information from the portable terminal 117 (more specifically, the angular velocity around the central axis of the body of the user 103) is greater than a prescribed threshold value, the following control unit 16 may determine that the user 103 has made a U-turn.

Concrete embodiments of the present invention have been described in the foregoing, but the present invention should not be limited by the foregoing embodiments and various modifications and alterations are possible within the scope of the present invention. For example, the moving object configured to move autonomously is not limited to the following vehicle 2 and the shopping cart 102 described above, and another moving object such as a robot and a drone can be widely used as the moving object configured to move autonomously. Similarly, the following target is not limited to the leading vehicle 3 and the person (the user 103) described above, and other moving objects such as a robot and an animal (pet) can be widely used as the following target. Further, the method for making the following target carry the information generation terminal is not limited to the above method, and various other methods can be used.

The invention claimed is:

1. A following target identification system for identifying a following target of a moving object configured to move autonomously, comprising:
   a portable information generation terminal having a wireless communication function and configured to generate following target information about a movement of the following target in a state where the information generation terminal is carried by the following target;
   a communication unit included in the moving object and configured to receive the following target information sent from the information generation terminal via wireless communication with the information generation terminal;
a following control unit included in the moving object and configured to determine a position of the following target based on the following target information; and
a pairing unit included in the moving object and configured to execute a pairing process about wireless communication between the information generation terminal and the communication unit,
wherein the following control unit is configured to set a position of the moving object as an initial position of the following target when the pairing process is completed.

2. The following target identification system according to claim 1, wherein the information generation terminal is configured to acquire a speed and an angular velocity of the following target and send the speed and the angular velocity to the communication unit as the following target information, and
the following control unit is configured to determine the position of the following target by estimating the position of the following target based on the speed and the angular velocity.

3. The following target identification system according to claim 2, wherein the following target is a person, and the moving object is a cart used by the person.

4. The following target identification system according to claim 3, wherein the following control unit is configured to acquire the angular velocity around a central axis of the person based on the following target information, and
in a case where the angular velocity around the central axis of the person is equal to or greater than a prescribed threshold value or in a case where a changing amount of an angle around the central axis of the person is equal to or greater than a prescribed other threshold value, the following control unit determines that the following target has made a change in direction.

5. The following target identification system according to claim 4, further comprising a movement control unit included in the moving object and configured to control a moving operation of the moving object,
wherein the following control unit is configured to calculate magnitude of the change in direction based on the angular velocity, and the movement control unit is configured to control a following operation of the moving object based on the magnitude of the change in direction.

6. The following target identification system according to claim 5, wherein in a case where the following target makes the change in direction after stopping for a predetermined period and the magnitude of the change in direction is equal to or greater than a first threshold value, the movement control unit controls the moving operation of the moving object such that the moving object approaches the following target.

7. The following target identification system according to claim 1, wherein the information generation terminal is configured to acquire a speed and an angular velocity of the following target, calculate the position of the following target based on the speed and the angular velocity, and send the position of the following target to the communication unit as the following target information.

8. The following target identification system according to claim 6, wherein in a case where the magnitude of the change in direction is equal to or greater than a second threshold value that is greater than the first threshold value, the movement control unit controls the moving operation of the moving object such that a movement of the moving object toward the following target is stopped.

9. The following target identification system according to claim 7, wherein the following target is a person, and the moving object is a cart used by the person.

10. The following target identification system according to claim 9, wherein the following control unit is configured to acquire the angular velocity around a central axis of the person based on the following target information, and
in a case where the angular velocity around the central axis of the person is equal to or greater than a prescribed threshold value or in a case where a changing amount of an angle around the central axis of the person is equal to or greater than a prescribed other threshold value, the following control unit determines that the following target has made a change in direction.

11. The following target identification system according to claim 10, further comprising a movement control unit included in the moving object and configured to control a moving operation of the moving object,
wherein the following control unit is configured to calculate magnitude of the change in direction based on the angular velocity, and the movement control unit is configured to control a following operation of the moving object based on the magnitude of the change in direction.

12. The following target identification system according to claim 1, further comprising an optical measurement unit included in the moving object and configured to detect one or plural objects present in a moving direction of the moving object and thereby generate object detection information about each of the objects,
wherein the following control unit is configured to determine the position of the following target based on the object detection information.

13. The following target identification system according to claim 12, wherein in a case where the object detection information includes information about the plural objects, the following control unit selects a closest object from the plural objects as the following target whose position is estimated based on the object detection information, the closest object being closest to the position of the following target estimated based on the following target information.

14. The following target identification system according to claim 12, wherein the following control unit is configured to determine the position of the following target by calculating a weighted average of a first position of the following target estimated based on the following target information and a second position of the following target estimated based on the object detection information.

15. The following target identification system according to claim 14, wherein the information generation terminal includes an inertial measurement unit part, and
the following control unit is configured to determine weight values in the weighted average based on a cumulative error about the first position caused by the inertial measurement unit part and an inherent error about the second position caused by the optical measurement unit.

16. A following target identification system for identifying a following target of a moving object configured to move autonomously, comprising:
a portable information generation terminal having a wireless communication function and configured to generate following target information about a movement of the following target in a state where the information generation terminal is carried by the following target;

a communication unit included in the moving object and configured to receive the following target information sent from the information generation terminal via wireless communication with the information generation terminal;

a following control unit included in the moving object and configured to determine a position of the following target based on the following target information; and an optical measurement unit included in the moving object and configured to detect one or plural objects present in a moving direction of the moving object and thereby generate object detection information about each of the objects, wherein the following control unit is configured to determine the position of the following target based on the object detection information, wherein the following control unit is configured to determine the position of the following target by calculating a weighted average of a first position of the following target estimated based on the following target information and a second position of the following target estimated based on the object detection information, and wherein in a case where a distance between the first position and the second position is equal to or greater than a prescribed threshold value, the following control unit determines the first position as the position of the following target regardless of the weighted average.

17. The following target identification system according to claim 16, wherein in a case where the distance between the first position and the second position becomes less than the prescribed threshold value after becoming equal to or greater than the prescribed threshold value, the following control unit determines the position of the following target by recalculating the weighted average of the first position and the second position, and in a case where the following control unit recalculates the weighted average, the following control unit reduces a weight value of the first position as compared with a last time.

* * * * *